E. Bigelow,

Syrup Fountain,

No. 547. Reissued May 4, 1858.

Witnesses;
David Clarke
Benj. E. Lawson

Inventor;
E. Bigelow

UNITED STATES PATENT OFFICE.

EDMUND BIGELOW, OF SPRINGFIELD, MASSACHUSETTS.

IMPROVED SIRUP-CASTER.

Specification forming part of Letters Patent No. 19,824, dated April 6, 1858; Reissue No. 547, dated May 4, 1858.

*To all whom it may concern:*

Be it known that I, EDMUND BIGELOW, of Springfield, in the county of Hampden and State of Massachusetts, have invented a new and improved apparatus for containing sirups and like articles, to be used for discharging said liquids in measured quantities, to be used in vending soda-water and other analogous articles of retail trade; and I do hereby declare that the following is a full and exact description thereof, reference being had to the accompanying drawings, and to the letters of reference marked thereon.

The nature of my invention consists in providing two or more vessels, apartments, or reservoirs (to be filled with different kinds of sirups or liquids) with measuring-faucets, which, by one turn of the handle or valve, or by one reciprocating movement of the same, a certain definite quantity of the sirup or liquor of either reservoir may be discharged into a glass or other receptacle, these reservoirs resting on a common base, these reservoirs being either in a line or circularly arranged, and being either permanently attached to or rotating on said base.

To enable others skilled in the art to make and use my invention, I will proceed to describe its construction and operation.

Figure 1:
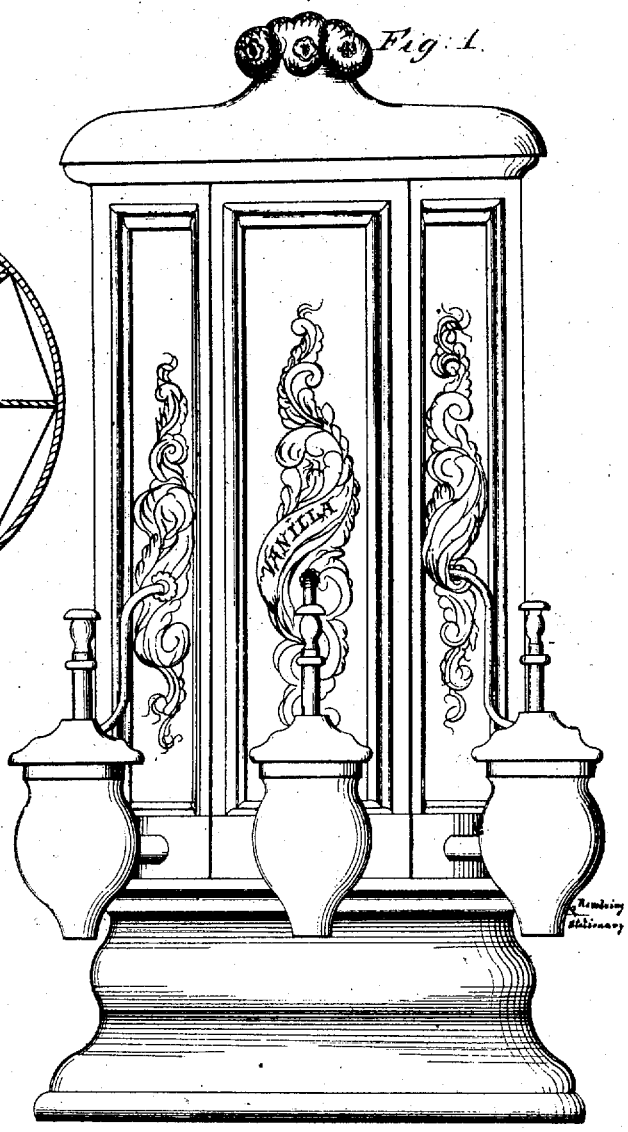
Figure 2:
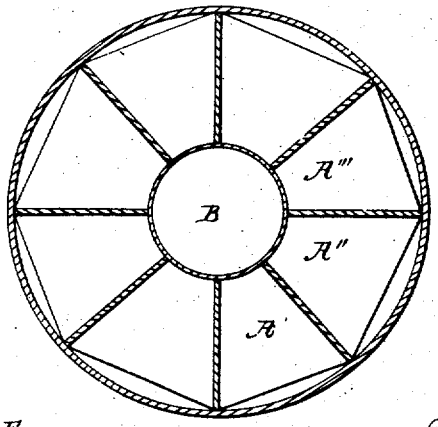
Figure 3:
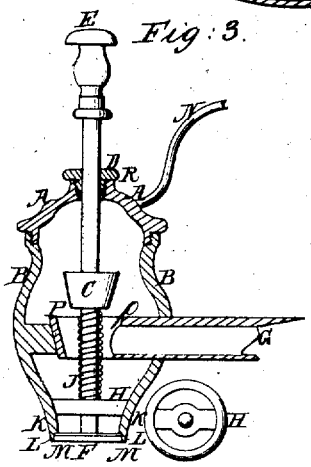

Figure 1 is a perspective view of the caster with its reservoirs circularly placed; Fig. 2, a transverse section of the same. The spaces A′ A″ A‴ represent reservoirs for sirup. The space B′ represents an ice-receptacle, the reservoirs fitting around the ice-receptacle. These sections are to be made of tinned copper or other suitable material and covered with a case to fit the form of the arrangement of the reservoirs with themselves and with the ice-vessel. Fig. 3 represents a longitudinal section of the sirup-register or self-measuring faucet. One register or faucet is connected with each sirup-apartment by a feed-pipe, (marked G, Fig. 1.)

A A is the cap to the register. B B is the body of the register.

C is a conical valve cast on rod D.

E is a head-piece to rod D.

F is a valve, made in two parts. The part K K is screwed to a bearing on rod D. A leather packing is put on and the part L L is screwed up, giving the valve a soft bearing.

M is a valve-seat. O is an oval port to pipe G. P is a ground seat for valve C.

H is a guide-bar to rod D.

R is a packing-box to pack rod D as it passes through cap A A.

J is a spiral spring resting on guide bar H and valve C.

N is a vent-tube running from cap-register to sirup-apartment A A to the height of the reservoir.

I do not confine myself to this special form of faucet, reserving the right to modify it while the faucet used retains substantially the described mode of operation.

The mode of using the caster is as follows: The several sirup apartments or reservoirs A A having been filled each with its appropriate sirup, the sirup flows through the pipe G and fills the register B, Fig. 3. The rod D being then pressed down by the hand, valve C is brought firmly into its seat P, closing the port O, and stopping the flow of sirup in the register. By the same movement of the rod D the valve F is opened and the sirup already in the register flows into the glass. On removing the hand from rod D the spiral spring J forces rod D back to original position, bringing valve F to a bearing and opening port O, and the register again instantly fills with sirup, and may again be emptied by renewing the pressure on rod D, as before.

This combination of self-measuring registers or faucets with the reservoirs of the caster filled with iced sirups dispenses with a set of fragile bottles, keeps all the sirups cold, and so preserves them from injury by the heat of the atmosphere, and enables the dealer to furnish soda-water about 15° colder than in the ordinary way, prevents the waste of sirups which always attends the use of the ordinary bottles, and enables the dealer to draw his soda-water with much greater rapidity than by the means now in use.

What I claim as my invention is—

The combination of a self-measuring faucet and air-tube with each of two or more reservoirs for sirup or like fluids, the reservoirs being on a common base, forming a caster, substantially as and for the purpose specified.

Witnesses: EDMUND BIGELOW.

A. L. SOULE,

H. D. SMITH.